United States Patent
Ha et al.

(10) Patent No.: US 8,973,033 B2
(45) Date of Patent: Mar. 3, 2015

(54) BROADCASTING SYSTEM AND METHOD OF PROVIDING A PERSONALIZED BROADCASTING SERVICE IN THE SAME

(75) Inventors: Kil-Su Ha, Seoul (KR); Su-Kyung Kim, Seoul (KR); Sung-Hun Park, Daejeon (KR)

(73) Assignee: Alticast Corporation, Seoul (KR)

( * ) Notice: Subject to any disclaimer, the term of this patent is extended or adjusted under 35 U.S.C. 154(b) by 373 days.

(21) Appl. No.: 12/979,513

(22) Filed: Dec. 28, 2010

(65) Prior Publication Data
US 2011/0162003 A1   Jun. 30, 2011

(30) Foreign Application Priority Data

Dec. 30, 2009 (KR) .................. 10-2009-0134019
Mar. 9, 2010 (KR) .................. 10-2010-0020809

(51) Int. Cl.
*H04N 7/10* (2006.01)
*H04N 21/235* (2011.01)
*H04N 21/431* (2011.01)
*H04N 21/435* (2011.01)
*H04N 21/472* (2011.01)
*H04N 21/4788* (2011.01)

(52) U.S. Cl.
CPC ......... *H04N 21/235* (2013.01); *H04N 21/4312* (2013.01); *H04N 21/4314* (2013.01); *H04N 21/435* (2013.01); *H04N 21/47202* (2013.01); *H04N 21/4788* (2013.01)

USPC .................. 725/34; 725/93; 709/231

(58) Field of Classification Search
CPC .................. H04N 21/812; H04N 21/4532
USPC .............. 725/87–118, 34; 709/217–232
See application file for complete search history.

(56) References Cited

U.S. PATENT DOCUMENTS

| 5,566,287 | A  | * | 10/1996 | Delpuch ............... 345/619 |
| 6,677,968 | B1 | * | 1/2004  | Appelman ............. 715/853 |
| 8,041,332 | B2 | * | 10/2011 | Kummer et al. ........ 455/404.1 |
| 8,139,582 | B2 | * | 3/2012  | Park et al. ............. 370/392 |
| 8,194,719 | B2 | * | 6/2012  | Sarkar et al. .......... 375/146 |
| 8,307,395 | B2 | * | 11/2012 | Issa et al. ............. 725/46 |
| 8,373,742 | B2 | * | 2/2013  | Wheatley et al. ...... 348/14.08 |
| 8,640,160 | B2 | * | 1/2014  | Stefanik et al. ....... 725/32 |
| 2001/0041589 | A1 | * | 11/2001 | Entwistle et al. ...... 455/556 |
| 2009/0265737 | A1 | * | 10/2009 | Issa et al. ............. 725/38 |

* cited by examiner

*Primary Examiner* — Annan Shang
(74) *Attorney, Agent, or Firm* — Maier & Maier, PLLC

(57) ABSTRACT

A broadcasting system where user's participation is allowed, additional information personalized for each of users/local areas/time is inserted into an AV and the AV including the additional information provides a user and a method of providing a personalized broadcasting service in the same are disclosed. The method of providing a personalized broadcasting service in a broadcasting system includes inserting additional information registered by a first user into an AV, and displaying the AV into which the additional information is inserted for a second user.

12 Claims, 12 Drawing Sheets

(A)

(B)

(A)

(B)

(A)

(B)

(C)

BROADCASTING SYSTEM AND METHOD OF PROVIDING A PERSONALIZED BROADCASTING SERVICE IN THE SAME

RELATED APPLICATIONS

This application is the U.S. national stage application which claims priority under 35 U.S.C. §119, to Korean Patent Application Nos.: 10-2009-0134019, filed on Dec. 30, 2009 and 10-2010-0020809, filed on Mar. 9, 2010, the disclosures of which are incorporated by reference herein their entireties.

TECHNICAL FIELD

Example embodiment of the present invention relates to a broadcasting system where user's participation is allowed, additional information personalized for each of users/local areas/time is inserted into an AV and the AV including the additional information provides the user, and a method of providing a personalized broadcasting service in the same.

RELATED ART

The present broadcasting system delivers simply an AV provided from a VOD supplier to viewers, and thus the viewers view unilaterally only a screen provided by a provider.

That is, the viewers' participation is not allowed in the broadcasting system, and so the broadcasting system may not satisfy viewer's desire.

In addition, the broadcasting system does not provide additional information personalized for each of the viewers and an interworking service.

The above information disclosed in this Related Art section is only for enhancement of understanding of the background of the invention and therefore it may contain information that does not form the prior art that is already known in this country to a person of ordinary skill in the art.

DISCLOSURE

Technical Problem

Accordingly, the present invention is provided to substantially obviate one or more problems due to limitations and disadvantages of the related art.

An example embodiment of the present invention provides a broadcasting system where viewer's participation is allowed and personalized additional information is provided to viewers (users), and a method of providing a personalized broadcasting service in the same.

Technical Solution

In one aspect, the present invention provides a method of providing a personalized broadcasting service in a broadcasting system, the method comprising: inserting additional information registered by a first user into an AV; and displaying the AV into which the additional information is inserted for a second user.

In another aspect, the present invention provides a management server included in a broadcasting system comprising: an additional information managing section configured to manage additional information registered by a first user; and an interworking data managing section configured to manage interworking data registered by the first user. Here, the management server transmits at least one of the additional information and the interworking data to a user terminal for a second user.

In still another aspect, the present invention provides a method of providing a personalized broadcasting service in a user terminal in a broadcasting system, the method comprising: receiving an AV and first additional information; inserting the first additional information into the AV; and outputting the AV into which the first additional information is inserted.

Advantageous Effects

A broadcasting system and a method of providing a personalized broadcasting service in the same of the present invention inserts additional information registered by a user (viewer) into an AV and provides the AV including the additional information, and so the user may participate in the broadcasting service and additional information may be provided differently in accordance with the user. Accordingly, the system and method may satisfy various users' desire. Specially, since the additional information is synchronized with the AV, the user may accept naturally the additional information inserted in the AV.

In addition, a management server exists separately from a provider server and user terminals and manages additional information, interworking data, user profile and meta information, etc., and thus load of the provider server and the user terminals may be reduced. Accordingly, operation efficiency of the broadcasting system may be maximized.

Additionally, since the user may receive the interworking data through the present channel or other channel while he views the AV, it is possible to provide various broadcasting services and interactive service.

Moreover, the system may provide a variety of additional information and the interworking data in accordance with user's tendency, and so many businesses using the additional information and the interworking data may be activated.

BRIEF DESCRIPTION OF DRAWINGS

Example embodiments of the present invention will become more apparent by describing in detail example embodiments of the present invention with reference to the accompanying drawings, in which.

Figure 1:
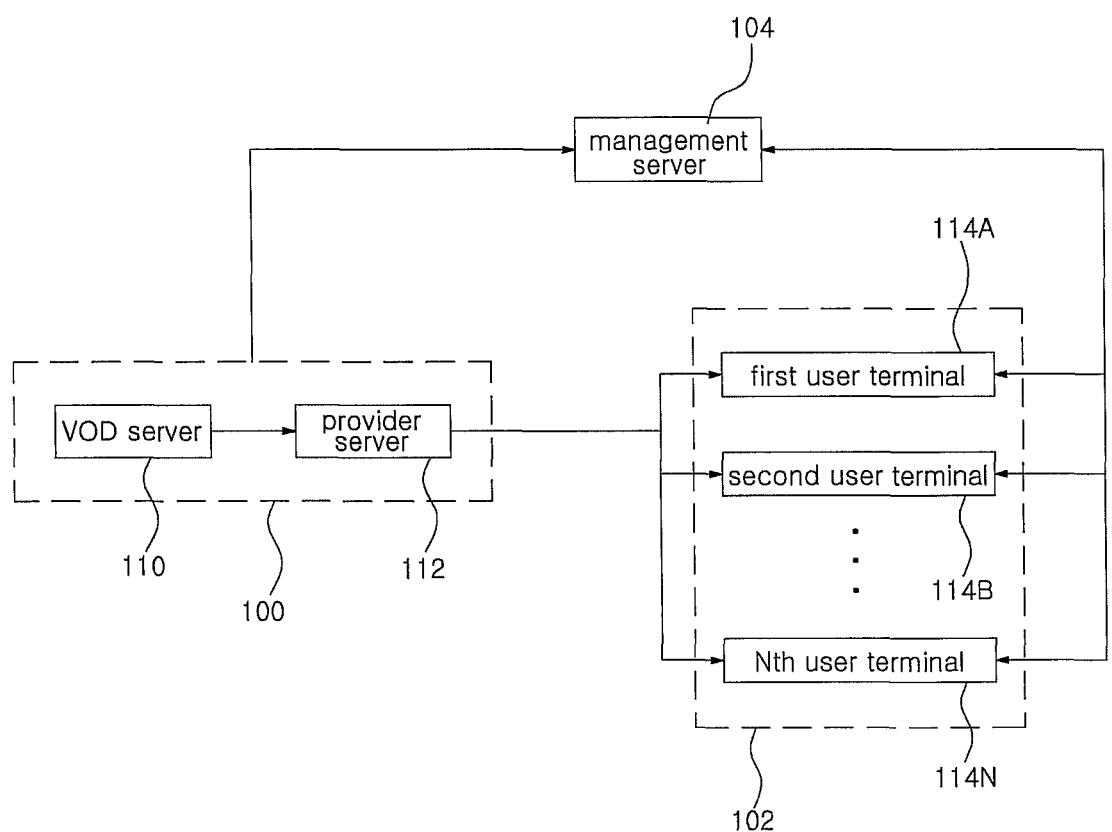
FIG. 1 is a block diagram illustrating a broadcasting system according to one embodiment of the present invention.

| | |
|---|---|
| 104: management server | 110: VOD server |
| 112: provider server | 114: user terminal |
| 1202: transmitting/receiving section | |
| 1204: meta information managing section | |
| 1206: additional information managing section | |
| 1208: interworking data managing section | |
| 1210: user identifying section | 1212: storage section |
| 1302: transmitting/receiving section | |
| 1304: additional information generating section | |
| 1306: additional information inserting section | |
| 1308: interworking data processing section | |
| 1310: playing section | 1312: display section |
| 1314: storage section | |

BEST MODE FOR CARRYING OUT THE INVENTION

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising, ", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to accompanying drawings.

FIG. 1 is a block diagram illustrating a broadcasting system according to one embodiment of the present invention.

In FIG. 1, the broadcasting system of the present embodiment inserts additional information for each of users to an AV and provides the AV including the additional information to corresponding user, and includes a provider section 100, a user section 102 and a management server 104.

The provider section 100 includes a VOD server 110 and a provider server 112.

The VOD server provides the AV and meta information corresponding to the AV to the provider server 112. Here, the AV includes audio data, video data, moving picture, broadcasting, etc., and the metal information as information related to the AV has channel information, program information, time information, camera ID and angle information, separator information and location marking information, etc.

The provider server 112 provides the AV to users, encodes properly the AV transmitted from the VOD server 110, and then broadcasts the encoded AV to the user terminals 114.

In alternative embodiment, the provider server 112 may unicast the AV to predetermined user terminal 114 in accordance with for example request of the management server 104.

The provider server 112 transmits the meta information provided from the VOD server 110 to the management server 104.

In one embodiment of the present invention, the provider server 112 is a headend in a broadcasting station, and transmits AV which is broadcasting data to the user terminals 114.

The user section 102 indicates an area for users (viewers) for viewing the AV, and includes the user terminals 114A to 114N used by the users. Here, the user terminals 114A to 114N means terminals capable of receiving the AV, and may be a set-top box STB, a laptop and a portable phone, etc.

It is desirable that the user terminal 114 has a multimedia player for playing the AV. In case that the user terminal 114 is the STB, the user terminal 114 is connected to a TV, etc.

In one embodiment of the present invention, each of the user terminals 114A to 114N has a means for inserting the additional information into the AV, and plays directly the AV including the additional information or plays the AV including the additional information through a display device such as TV, etc.

In another embodiment of the present invention, each of the user terminals 114A to 114N further includes a means for generating the additional information and/or the interworking data and editing the information and the data as described below.

The management server 104 stores the meta information transmitted from the provider section 100, preferably the provider server 112 and the additional information for each of the users. Here, the additional information means information related to the users such as text, image, moving picture, 3D, etc., and is generated and edited by the users.

Additionally, the management server 104 registers and stores the interworking data, user profile, schedule information and channel ID information, etc. as well as the additional information.

Moreover, the management server 104 transmits additional information and/or interworking data to corresponding user terminal 114 with reference to the user profile when providing a personalized broadcasting service.

In brief, in the broadcasting system of the present embodiment, the provider server 112 broadcasts the AV to the user terminals 114A to 114N, and the management server 104 transmits the additional information and the interworking data for the user to be serviced to corresponding user terminal 114. In this case, the user terminal 114 inserts the additional information into the AV, plays the AV including the additional information through its display section or other display device, and displays the interworking data through the present channel or other channel in accordance with request of the user.

In other words, the broadcasting system of the present invention may provide the personalized broadcasting service where the user may participate in the service.

In addition, the broadcasting system includes independently the management server 104 for managing the additional information and the interworking data, etc., and the users may generate and edit the additional information and the interworking data using the management server 104. Hence, convenience of the users may be enhanced.

Furthermore, since the broadcasting system of the present embodiment may provide different information in accordance with user/time/period/local area, various users' desire may be satisfied.

Hereinafter, operation of the broadcasting system of the present invention will be described in detail with reference to accompanying drawings.

Firstly, a process of registering the additional information and the interworking data to the management server 104 will be described.

Figure 2:
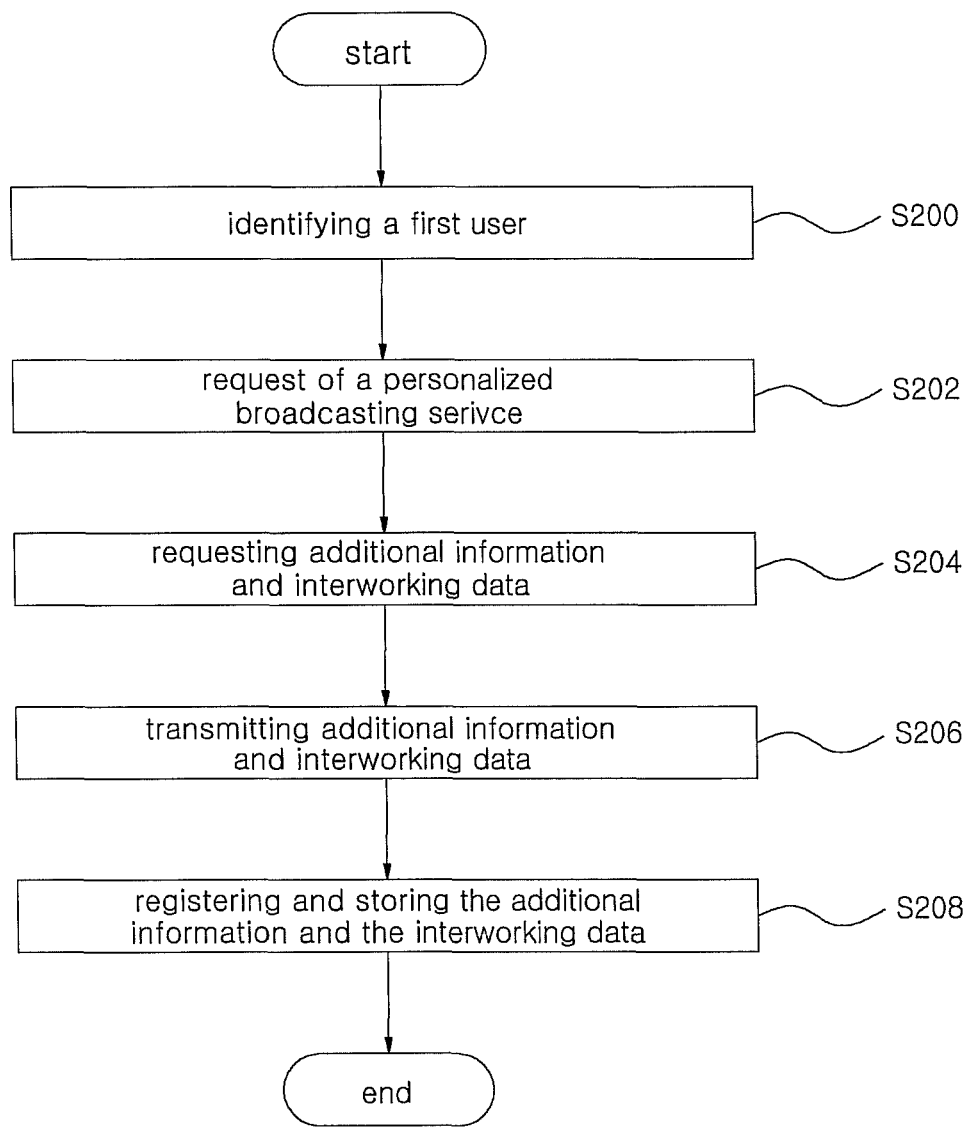
FIG. 2 is a flowchart illustrating a process of registering additional information and interworking data according to one embodiment of the present invention.

FIG. 2 is a flowchart illustrating a process of registering additional information and interworking data according to one embodiment of the present invention.

In FIG. 2, the management server 104 identifies a user to who a personalized broadcasting service is provided in step of S200.

In one embodiment of the present invention, the user terminal 114 transmits its ID or identification number, etc. to the management server 104 in accordance with user's request or automatic control. Subsequently, the management sever 104 verifies whether or not ID transmitted from the user terminal 114 is identical to ID in its table, and identifies the user terminal 114 in accordance with the verification. Then, the management server 114 transmits the identification result to the user terminal 114, and starts the personalized broadcasting service in case that the user terminal 114 is identified.

The above identification process may be performed in accordance with request of the management server 104, but may be performed automatically when the user terminal 114 is booted.

In step of S202, the user may request the personalized broadcasting service to the management server 104 by using the user terminal 114 or Internet.

In alternative embodiment, the management server 104 may inquiry whether or not the user uses the personalized broadcasting service to the user terminals 114A to 114N after the identification process is completed. In this case, the personalized broadcasting service is started only when the user accepts the service.

The management server 104 requests the additional information and the interworking data to the user terminal 114 in step of S204, and the user terminal 114 transmits the additional information and the interworking data to the management server 104 in step of S206.

In one embodiment of the present invention, the management server 104 provides an editing tool to the user terminal 114, and the user generates the additional information and the interworking data by using the editing tool. For example, the management server 104 may provide the editing tool with information, that the additional information can be inserted in a certain area and time zone in a moving picture "avatar", to the user terminal 114. In this case, the user may generate the additional information which is a text "I love OO, and will you marry me?" and the interworking data "propose moving picture" interworked with the additional information. In alternative embodiment, the user may select desired time zone of many time zones and desired area in which the additional information is inserted. Subsequently, the user terminal 114 may designate a user who will receive the additional information "I love OO, and will you marry me?" and the interworking data "propose moving picture", and transmit the additional information, the interworking data and informing concerning the designated user to the management server 104.

In another embodiment of the present invention, the user may generate the additional information and the interworking data by using a program included in the user terminal 114.

In still another embodiment of the present invention, the user may transmit additional information and interworking data generated (or stored) by other device such as a laptop, etc. not the user terminal 114 to the management server 104 through the other device or the user terminal 114.

In still another embodiment of the present invention, the user may not transmit the additional information and the interworking data to the management 104, and use preregistered additional information and interworking data as additional information and interworking data for the personalized broadcasting service.

In still another embodiment of the present invention, the user may generate additional information and interworking data after accessing to a webpage provided by the management server 104.

In step of S208, the management server 104 registers and stores the additional information and the interworking data transmitted from the user terminal 114 as additional information and interworking data for the personalized broadcasting service. It is desirable to register and store individually the additional information and the interworking data for each of the users.

In short, the user may generate the additional information and the interworking data or use preregistered additional information and interworking data.

In alternative embodiment, the user may purchase and use additional information and interworking data provided by a provider.

The additional information and the interworking data are registered, and then the personalized broadcasting service is provided.

Hereinafter, various personalized broadcasting services will be described in detail with reference to accompanying drawings.

Figure 3:
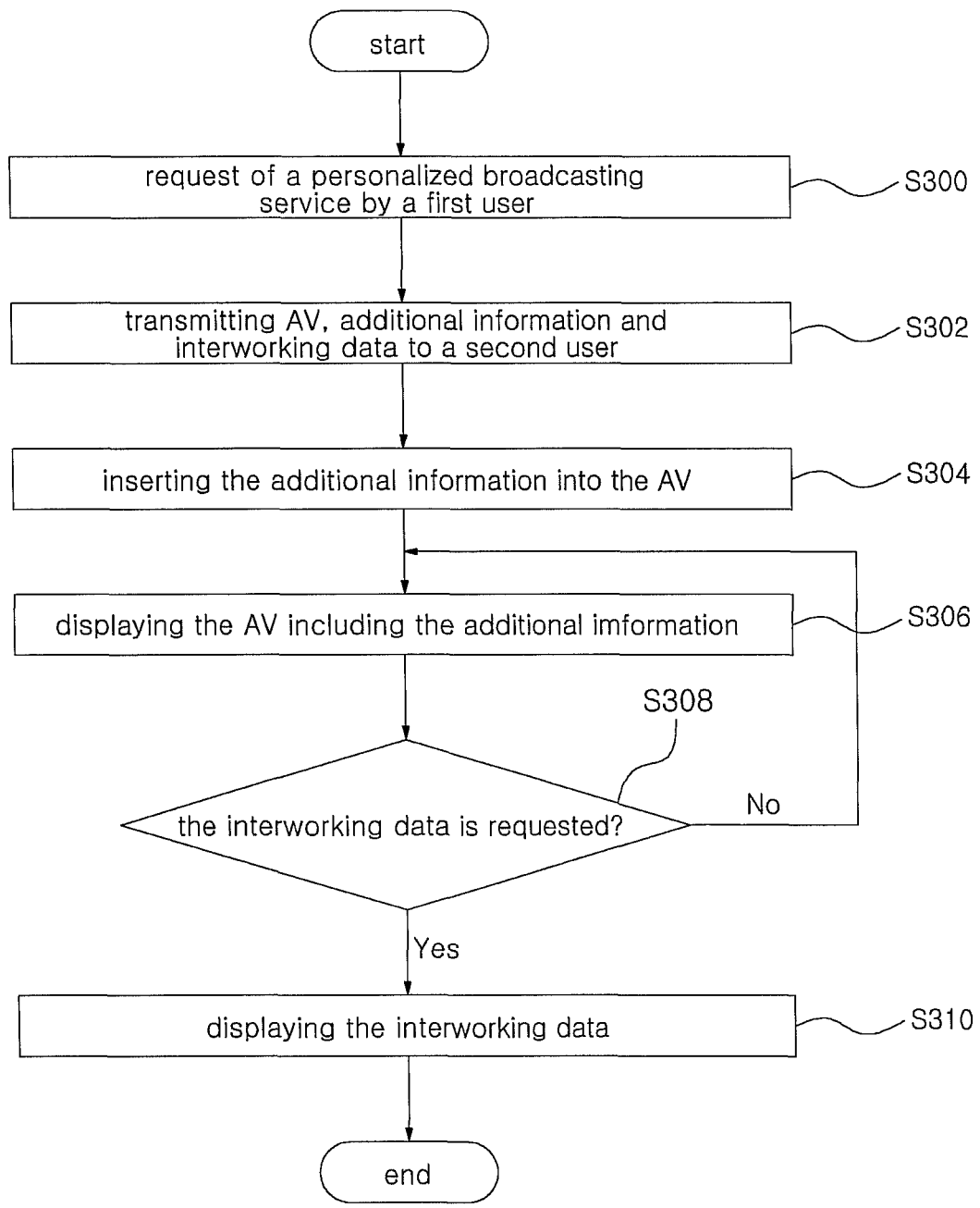
FIG. 3 is a flowchart illustrating a process of providing a personalized broadcasting service according to a first embodiment of the present invention.
Figure 4:
FIG. 4 is a view illustrating example of the personalized broadcasting service according to one embodiment of the present invention.
Figure 4:
Figure 4:
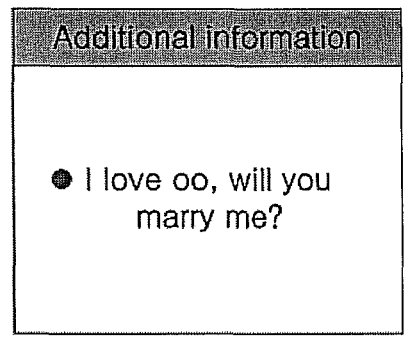
Figure 4:
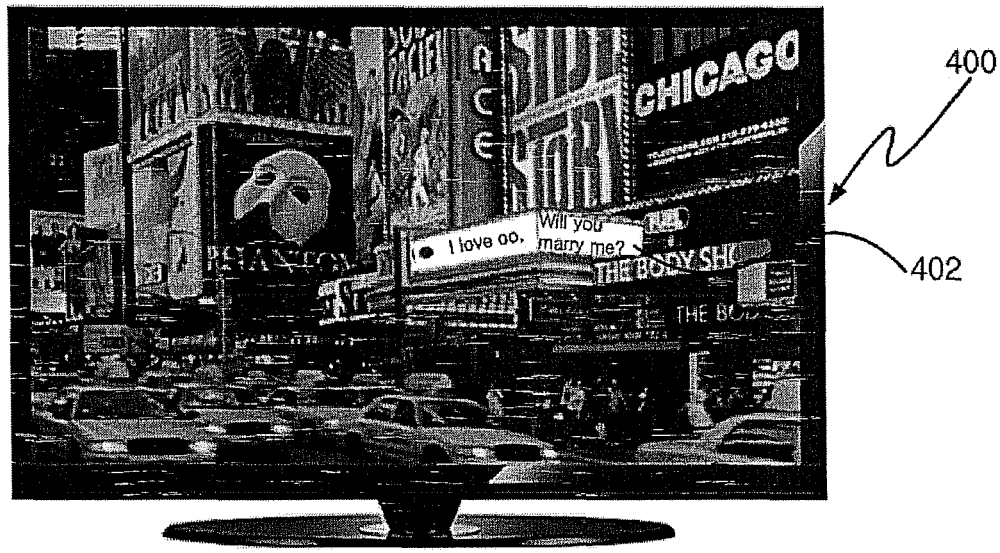
Figure 5:
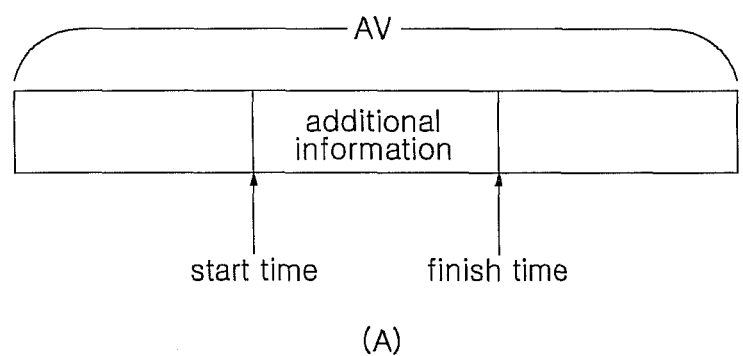
FIG. 5 is a view illustrating a frame in an AV including additional information according to one embodiment of the present invention.
Figure 5:
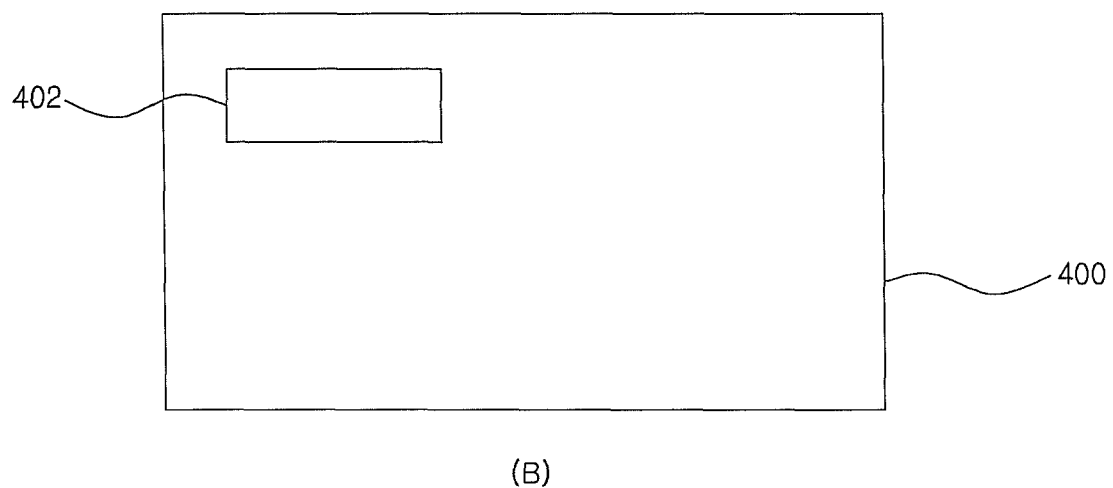

FIG. 3 is a flowchart illustrating a process of providing a personalized broadcasting service according to a first embodiment of the present invention, and FIG. 4 is a view illustrating example of the personalized broadcasting service according to one embodiment of the present invention. FIG. 5 is a view illustrating a frame in an AV including additional information according to one embodiment of the present invention.

In FIG. 3, a first user who is a member of a personalized broadcasting service requests the personalized broadcasting service to the management server 104 through his user terminal 114 in step of S300. In the S300, the first user may designate a second user to be serviced, or the second user may be preset in the management server 104.

In step of S302, the management server 104 transmits additional information, e.g. a text "I love OO, and will you marry me?" as shown in FIG. 4(A) to a user terminal 114 (hereinafter, referred to as "a second user terminal") with reference to user profile, and the provider server 112 transmits an AV designated by the first user or an AV, e.g. drama, etc. provided at predetermined time in accordance with broadcasting schedule to the second user terminal 114B. Here, the management server 104 may transmit together the interworking data as well as the additional information when the additional information is transmitted, or transmit the interworking data to the second user terminal 114B in accordance with request of the second user after transmitting the additional information.

In step S304, the second user terminal 114B inserts the additional information into the AV as shown in FIG. 5. Here, a start time and a finish time at which the additional information is inserted may be preset as shown in FIG. 5, and so the additional information is displayed only during period between the start time and the finish time.

In alternative embodiment, an area on which the additional information is displayed of a screen may be preset, this is not mentioned above.

In one embodiment of the present invention, the additional information may be inserted in the AV which is regarded as one clip. In alternative embodiment, the AV is divided into a plurality of clips, and the additional information is inserted into some of the clips. It is desirable that the additional information is inserted into some of the clips in consideration of operation efficiency of the broadcasting system.

In step of S306, the second user terminal 114B displays the AV including the additional information through its display section or a display device, e.g. TV, etc. connected thereto. For example, the AV is played on the TV connected to a STB which is the second user terminal 114B, and the text "I love OO, and will you marry me?" as the additional information may be inserted into a part 402 of a screen 400, e.g. into a building sign as shown in FIG. 4(B). In this case, the text may be expressed with color different from a background so that the second user can recognize definitely the text, or a scene which the text is shown may be slowly played.

In another embodiment of the present invention, a step of identifying whether or not the second user is a member of the broadcasting service and a step of determining whether or not the second user accepts the additional information set by the first user may be further performed before the step of S306.

In step of S308, the second user terminal 114B detects whether or not the second user requests the interworking data. Particularly, a red button (interface) for request of the interworking data may be blinked beside the text as shown in FIG. 4(B), and the second user may request the interworking data through selection of the button. Here, the user may select the button using a mouse or a remote controller or select the button by touching directly the button.

In case that the second user does not request the interworking data, the step S306 is performed continuously.

In case that the second user requests the interworking data by selecting the button, the second user terminal 114B displays a video or an audio corresponding to the interworking data through its display section or the display device connected thereto in step of S310. For example, in case that the second user selects the button, a channel is converted and "propose moving picture", "picture slide show of remembrance", etc. may be shown through the converted channel. In this case, the interworking data may be transmitted from the management server 104, or be pre-stored in the user terminal 114B, be read and then be used.

In another embodiment of the present invention, in case that the second user selects the button, "propose moving picture" or "picture slide show of remembrance" may be shown with pop-up type on whole or some of a screen on which the AV is displayed.

In still another embodiment of the present invention, in case that the second user selects the button, audio of the AV is paused and "propose message" recorded by the first user may be outputted. Here, a voice may be outputted with the moving picture.

In brief, in the personalized broadcasting service of the present embodiment, the additional information set by the first user is inserted into the AV, and the second user receives the additional information through the AV.

In above description, the first user provides the additional information to the second user. However, the first user not the second user may receive the additional information and the interworking data.

Figure 6:
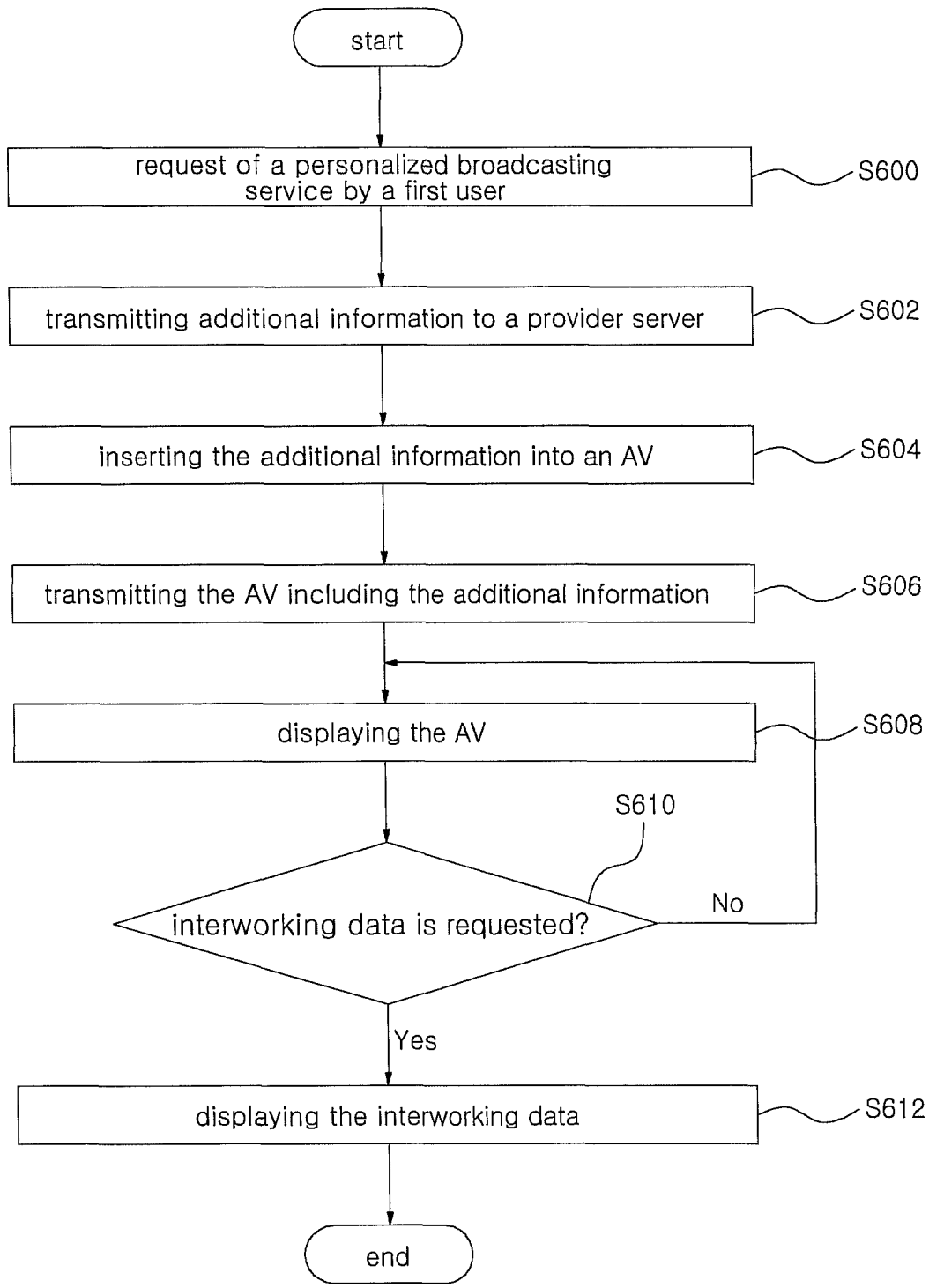
FIG. 6 is a flowchart illustrating a personalized broadcasting service according to a second embodiment of the present invention.

FIG. 6 is a flowchart illustrating a personalized broadcasting service according to a second embodiment of the present invention.

Referring to FIG. 6, a first user requests the personalized broadcasting service to the management server 104 in step of S600.

In step of S602, the management server 104 transmits additional information registered by the first user to the provider server 112.

In step of S604, the provider server 112 inserts the transmitted additional information into an AV to be transmitted to the second user.

In step of S606, the provider server 112 transmits the AV including the additional information to the user terminal 114 of the second user.

In step of S608, the user terminal 114 displays the AV including the additional information through its display section or a display device connected thereto.

In step of S610, the user terminal 114 detects whether or not the second user requests an interworking data.

In case that the interworking data is not requested, the step S608 is performed continuously.

In case that the interworking data is requested, the user terminal 114 displays the interworking data through its display section or the display device. For example, in case that the interworking data is requested, the user terminal 114 transmits information concerning the request of the interworking data to the management server 104, and the management server 104 transmit the interworking data for the second user to the user terminal 114.

In another embodiment of the present invention, the management server 104 may transmit the interworking data as well as the additional information to the provider server 112 when it transmit the additional information, and the provider server 112 may transmit the interworking data to the provider terminal 114 in case that the interworking data is requested. However, the provider server 112 may transmit the interworking data as well as the AV when the AV is transmitted.

In short, in the personalized broadcasting service of the present embodiment, the provider server 112 inserts the additional information into the AV, and the provider server 112 transmits the AV including the additional information to the user terminal 114.

In another embodiment of the present invention, the provider server 112 may transmit the AV to the management server 104, and the management server 104 may insert the additional information into the AV and transmit the AV including the additional information to the user terminal 114.

Figure 7:
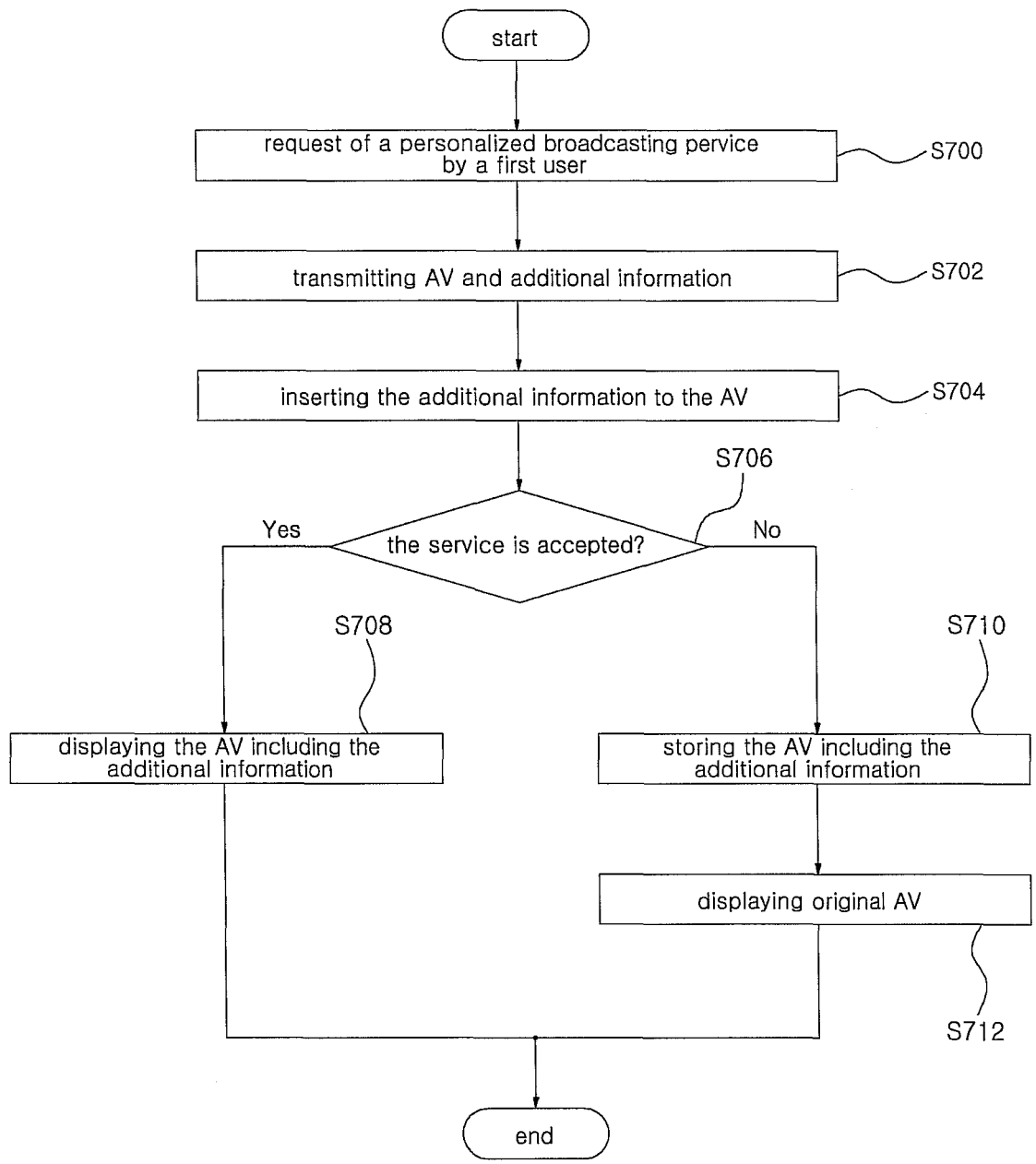
FIG. 7 is a flowchart illustrating a personalized broadcasting service according to a third embodiment of the present invention.
Figure 8:
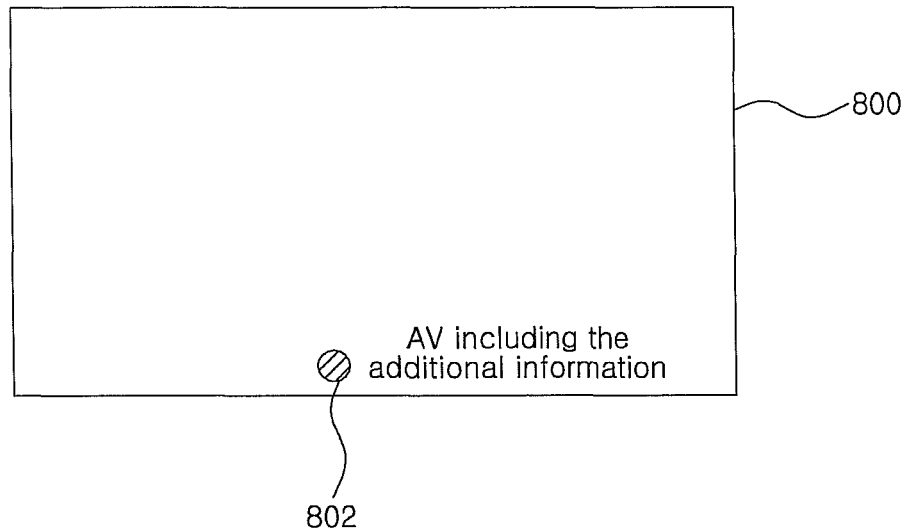
FIG. 8 is a view illustrating a screen on which an AV is displayed according to one embodiment of the present invention.

FIG. 7 is a flowchart illustrating a personalized broadcasting service according to a third embodiment of the present invention, and FIG. 8 is a view illustrating a screen on which an AV is displayed according to one embodiment of the present invention.

In step of S700, a first user requests a personalized broadcasting service to the management server 104.

In step of S702, the management server 104 transmits additional information to the user terminal 114 of a second user designated by the first user in accordance with request of the personalized broadcasting service, and the provider server 112 transmits an AV to the user terminal 114. Here, the user terminal 114 is selected in accordance with user profile.

In step of S704, the user terminal 114 inserts the additional information into the AV.

In step of S706, it is detected whether or not the second user accepts the personalized broadcasting service. Particularly, the user terminal 114 inquires to the second user whether or not the second user accepts the personalized broadcasting service through its display section or a display device connected thereto, i.e. views the AV including the additional information in case that the AV exists. The step S706 is performed in order to assure privacy of the second user because other person not the second user can view the AV including the additional information.

In step of S708, the user terminal 114 displays the AV including the additional information in case that the second user accepts the broadcasting service.

In case that the second user does not accept the broadcasting service, the user terminal 114 stores the AV including the additional information in step of S710, and displays original AV where the additional information is not inserted in step of S712.

In one embodiment of the present invention, the user terminal 114 stores the AV including the additional information, or the user terminal 114 may transmit the AV to the management server 104 and the management server 104 may store the AV.

In another embodiment of the present invention, the user terminal 114 displays the original AV, a button 802 for noting existence of the AV including the additional information be displaying on a part of a screen 800 as shown in FIG. 8.

Accordingly, in case that the second user wants to view the AV including the additional information, the second user may view the AV including the additional information by clicking the button 802. In this case, the AV including the additional information may be displayed from next scene of a scene viewed in the original AV, or the original AV may be finished and the AV including the additional information may be played again from the beginning.

In addition, the original AV and the AV including the additional information may be displayed simultaneously. Here, the AV including the additional information may be displayed through different channel from the original AV, or be displayed with pop-up type on a part of a screen on which the original AV is displayed.

In brief, the personalized broadcasting service of the present embodiment provides the AV in consideration of the user's privacy.

Figure 9:
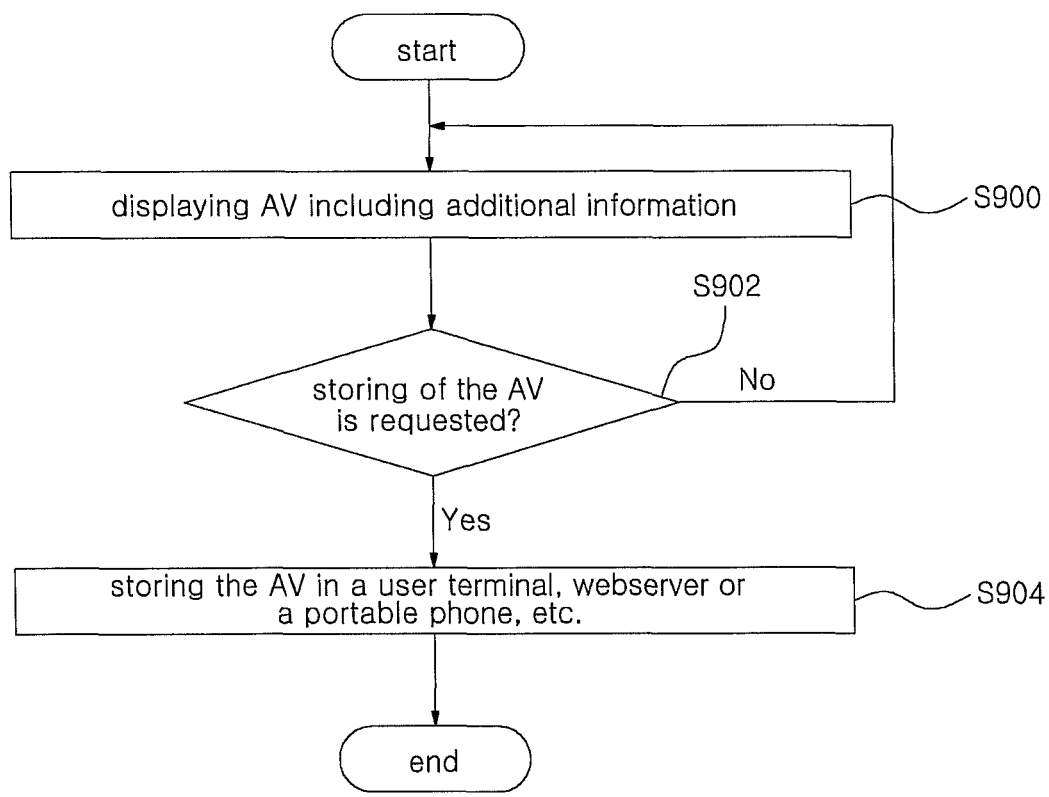
FIG. 9 is a flowchart illustrating a process of providing a personalized broadcasting service according to a fourth embodiment of the present invention.
Figure 10:
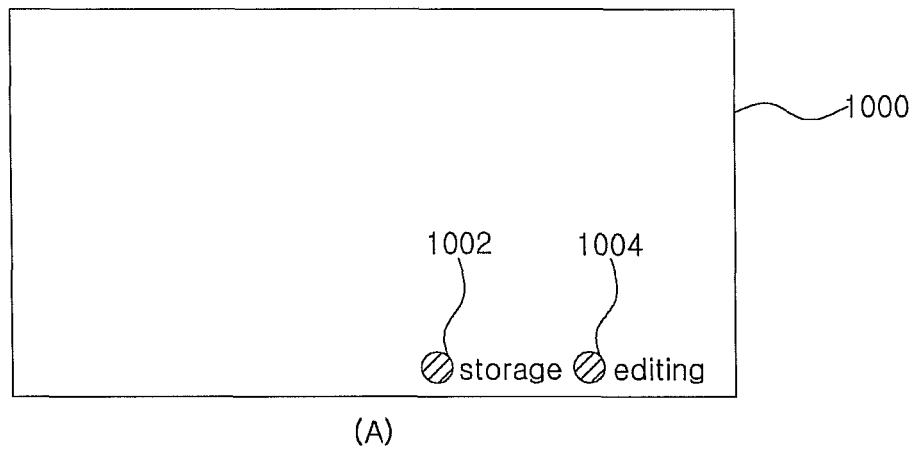
FIG. 10 is a view illustrating a process of storing an AV according to one embodiment of the present invention.
Figure 10:
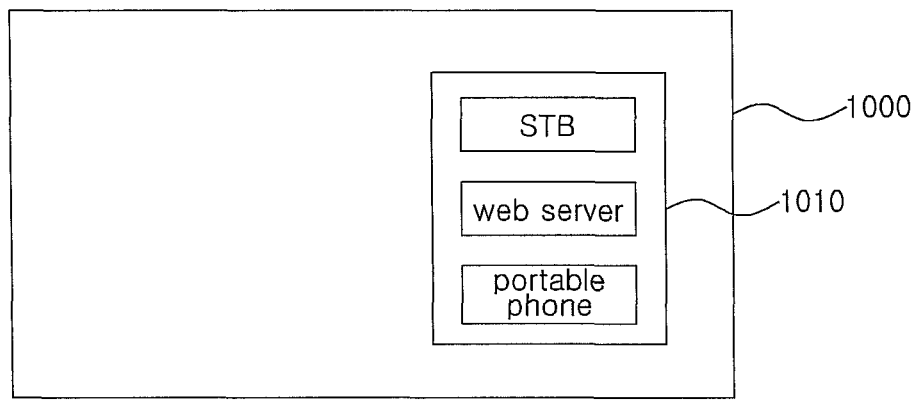
Figure 10:
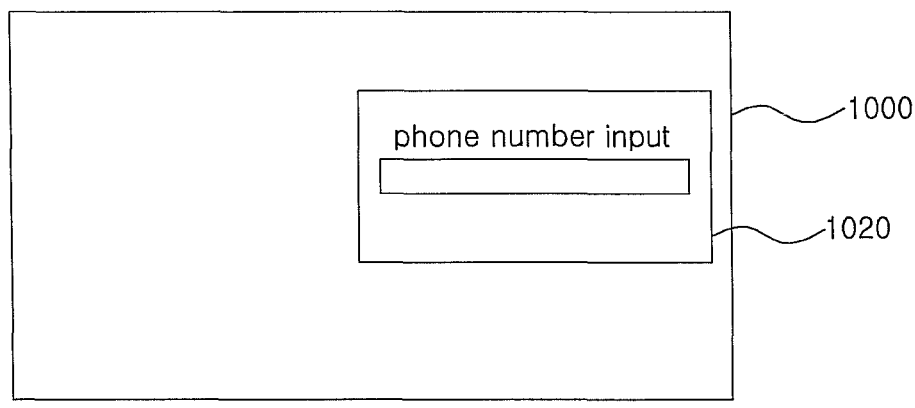

FIG. 9 is a flowchart illustrating a process of providing a personalized broadcasting service according to a fourth embodiment of the present invention, and FIG. 10 is a view illustrating a process of storing an AV according to one embodiment of the present invention.

In FIG. 9, the user terminal 114 displays an AV including additional information though its display section or a display device connected thereto in step of S900.

In step of S902, it is detected whether or not storing of the displayed AV is requested. Particularly, a storage button 1002 may be displayed on a screen 1000 on which the AV is displayed as shown in FIG. 10(A). In case that the user clicks the storage button 1002, it is determined that the user requests the storing of the AV.

In case that the storing of the AV is not requested, the step S900 is performed continuously.

In case that the storing of the AV is requested, the user terminal 114 stores the AV in its storage section, the management server 104 or user's portable phone, etc. in step of S904. For example, in case that the user clicks the storage button 1002, a screen shown in FIG. 10(B) is displayed. In case that the user selects the portable phone, the AV may be stored in the user's portable phone by inputting phone number in a phone number input shown in FIG. 10(C).

In one embodiment of the present invention, the user terminal 114 may store whole of the AV including the additional information, or store only a clip of the AV into which the additional information is inserted. In case that the additional information is stored in the portable phone, etc., it is desirable that the clip is stored because the portable phone, etc. has small storage capacity.

In short, the personalized broadcasting service of the present embodiment may store the AV including the additional information through various methods.

The user terminal 114 may store the interworking data as well as the AV, and is not shown above.

Figure 11:
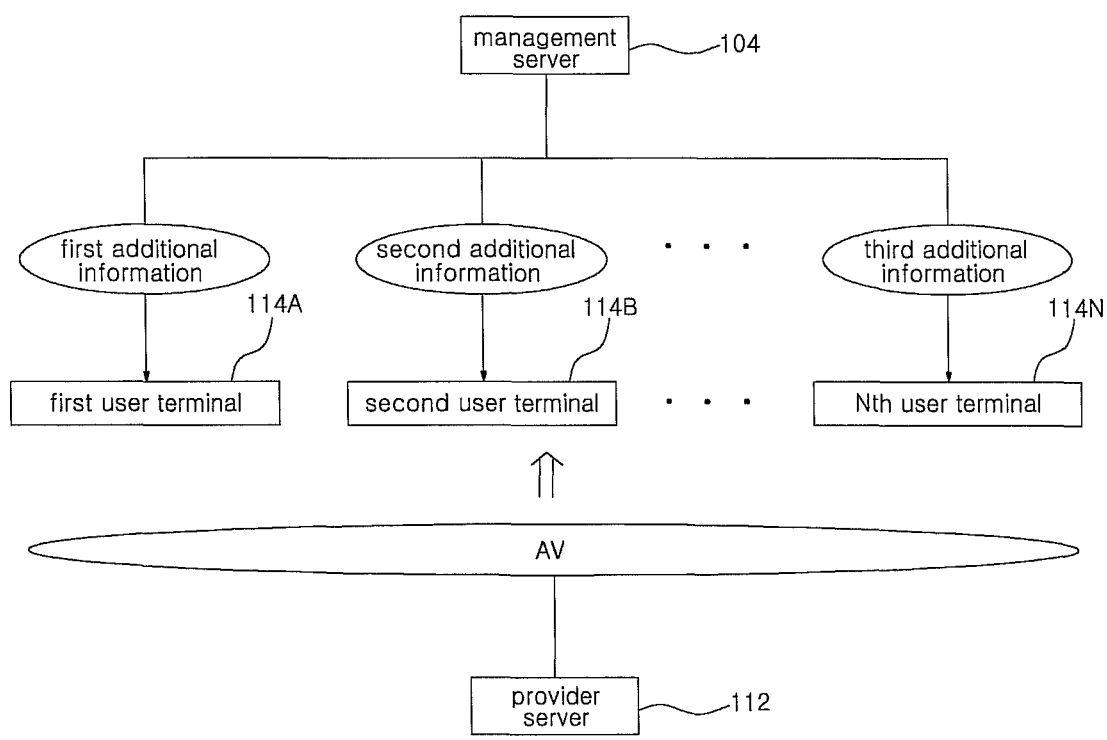
FIG. 11 is a view illustrating a broadcasting system according to one embodiment of the present invention.

FIG. 11 is a view illustrating a broadcasting system according to one embodiment of the present invention.

In FIG. 11, the provider server 112 broadcasts the AV to the user terminal 114A to 114N, and the management server 104 may provide different additional information to each of the user terminals 114A to 114N. As a result, though the user terminals 114A to 114N receive the same AV from the provider server 112, the user terminals 114A to 114N may display different screens.

In another embodiment of the present invention, in case that a first user wants to send group message to other users, he registers the other users, and the management server 104 provide the same additional information to the user terminals 114 of the other users. As a result, the other users may view an AV including the same additional information.

Hereinafter, elements in the broadcasting system will be described in detail with reference to accompanying drawings.

Figure 12:
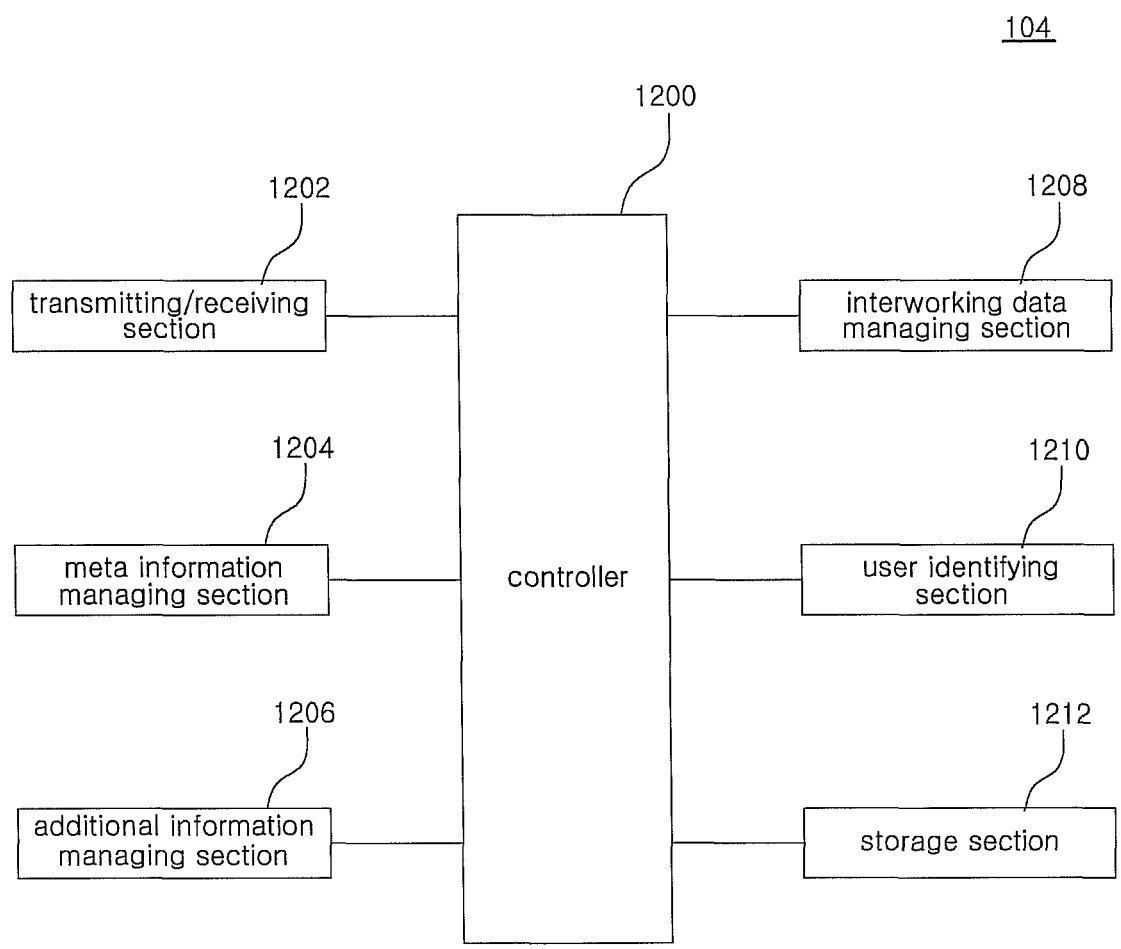
FIG. 12 is a block diagram illustrating a management server according to one embodiment of the present invention.

FIG. 12 is a block diagram illustrating a management server according to one embodiment of the present invention.

In FIG. 12, the management server 104 of the present embodiment includes a controller 1200, a transmitting/receiving section 1202, a meta information managing section 1204, an additional information managing section 1206, an interworking data managing section 1208, a user identifying section 1210 and a storage section 1212.

The transmitting/receiving section 1202 connects the management server 104 to the provider server 112 or the user terminals 114, and uses wire communication or wireless communication.

The meta information managing section 1204 manages the meta information related to the AV transmitted from the provider server 112.

The additional information managing section 1206 manages the additional information registered by the users. For example, the additional information managing section 1206 registers and edits the additional information, and may provide the editing tool for editing the additional information to the users. The additional information managing section 1206 may provide the editing tool to the user terminals 114 and the users may use the editing tool through their user terminals 114, or the users may access a web server and generate the additional information using the web server.

The interworking data managing section 1208 manages the interworking data, specially processes the interworking data to proper format, and transmits the processed interworking data to the user terminal 114.

The user identifying section 1210 identifies the users by for example verifying ID of the user terminals 114.

The storage section 1212 stores various data such as the meta information, the user profile, the additional information, the interworking data, etc.

The controller 1200 controls operation of elements in the management server 104.

Figure 13:
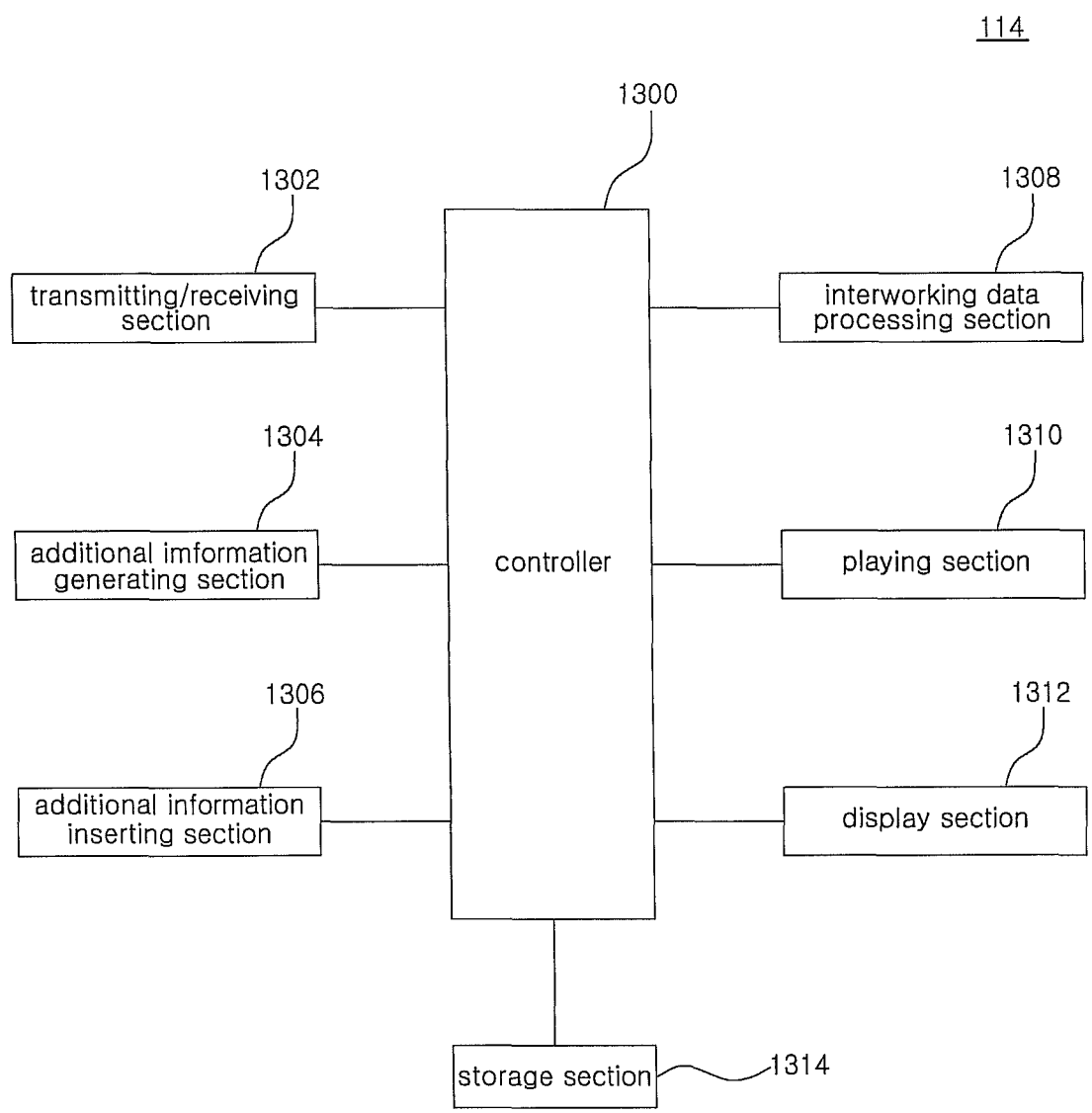
FIG. 13 is a block diagram illustrating a user terminal according to one embodiment of the present invention.

FIG. 13 is a block diagram illustrating a user terminal according to one embodiment of the present invention.

In FIG. 13, the user terminal 114 of the present embodiment includes a controller 1300, a transmitting/receiving section 1302, an additional information generating section 1304, an additional information inserting section 1306, an interworking data processing section 1308, a playing section 1310, a display section 1312 and a storage section 1314.

The transmitting/receiving section 1302 connects the user terminal 114 to the provider server 112 or the management server 104, and uses wire communication or wireless communication.

The additional information generating section 1304 provides a program and the editing tool for generating the additional information desired by the user.

The additional information inserting section 1306 inserts the additional information transmitted from the management server 104 into the AV broadcasted from the provider server 112.

The interworking data processing section 1308 manages the interworking data transmitted from the management server 104, and plays the interworking data in accordance with control of the playing section 1310 when the user requests the interworking data.

The playing section 1310 plays the AV including the additional information and the interworking data.

The display section 1312 displays the AV including the additional information and the interworking data, and is for example a liquid crystal display LCD, an organic electroluminescent device OELD, etc.

The storage section 1314 stores the program, the AV including the additional information or the interworking data.

The controller 1300 controls operation of elements in the user terminal 114.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method of providing a personalized broadcasting service in a broadcasting system, the method comprising:
storing meta information related to an AV and user profile,
generating additional information using the meta information according to a request of a first user, wherein a start time, a finish time of the additional information in the AV and an insert area are set for the additional information; and
transmitting the additional information to a second user terminal designated by the first user,
wherein the second user terminal inserts the additional information in the insert area between the start time and the finish time and displays the AV into which the additional information is inserted.

2. The method of claim 1,
wherein the first user generates the additional information using an editing tool in a first user terminal used by the first user or an editing tool provided from a management server.

3. The method of claim 1, further comprising:
identifying the first user; and
providing interworking data,
wherein a button for request of the interworking data is displayed on a part of a screen on which the AV including the additional information is displayed, and the interworking data is displayed through the present channel or other channel in case that the second user selects the button.

4. A management server included in a broadcasting system, the server comprising:
an additional information managing section configured to manage additional information registered by a first user, wherein a start time, a finish time of the additional information in the AV and an insert area are set for the additional information;
an interworking data managing section configured to manage interworking data registered by the first user; and
a transmitting/receiving section configured to transmit at least one of the additional information and the interworking data to a user terminal for a second user,
wherein the second user terminal inserts the additional information in the insert area between the start time and the finish time and the displays the AV into which the additional information is inserted,
wherein the additional information is displayed with a background having a different color, or a scene in which the additional information is shown is played slowly so that the additional information is recognizable by the second user.

5. The management server of claim 4, wherein the additional information and the interworking data are generated by the first user, the additional information is transmitted to the user terminal when an AV is transmitted from a provider server to the user terminal, and the interworking data is provided to the user terminal in accordance with request of the second user while an AV including the additional information is displayed through a display section of the user terminal or a display device connected to the user terminal.

6. The management server of claim 4, further comprising:
a meta information managing section configured to manage meta information related to an AV transmitted from a provider server;
a user identifying section configured to identify at least one of the first user and the second user; and
a storage section configured to store user profile,
wherein the management server transmits the additional information or the interworking data to the user terminal with reference to the user profile, and the storage section stores individually the additional information and the interworking data for each of users in accordance with the user profile.

7. The management server of claim 6, wherein location, size, time or information of the additional information when the additional information is inserted into the AV is set by using the meta information.

8. The management server of claim 4, wherein the additional information managing section provides an editing tool for inputting, editing, scheduling, amending or deleting the additional information to the first user, or provides the editing tool through a webpage.

9. A method of providing a personalized broadcasting service in a user terminal in a broadcasting system, the method comprising:
receiving an AV and a first additional information, wherein a start time, a finish time of the first additional information in the AV and an insert area are set for the additional information; and
inserting the first additional information in the insert area between the start time and the finish time; and
outputting the AV into which the first additional information is inserted, with the additional information displayed with a background having a different color, or with a scene in which the additional information is shown being played slowly so that the additional information is recognizable by the second user.

10. The method of claim 9, further comprising:
receiving interworking data,
wherein an interface for request of the interworking data is displayed on a screen on which the AV including the first additional information is displayed, and the interworking data is synchronized with the AV and is displayed through the present channel or other channel in case that a user selects the interface.

11. The method of claim 9, further comprising:
generating second additional information; and
transmitting the generated second additional information to a management server,
wherein the management server registers the transmitted second additional information.

12. The method of claim 9, wherein location, size, time and information of the first additional information when the first additional information is inserted into the AV is determined on the basis of meta information related to the AV.

* * * * *